United States Patent [19]

Yezrielev et al.

[11] Patent Number: 5,458,920
[45] Date of Patent: Oct. 17, 1995

[54] GLOSS REDUCTION AGENT FOR SOLVENT BASED PIGMENTED COATING FORMULATIONS

[75] Inventors: Albert I. Yezrielev, Houston, Tex.; William E. Wellman, Edison, N.J.; Ralph M. Kowalik, Kingwood, Tex.; Robert N. Sachs, Brick, N.J.

[73] Assignee: Exxon Chemical Patents, Inc., Wilmington, Del.

[21] Appl. No.: 246,910

[22] Filed: May 20, 1994

[51] Int. Cl.$^6$ ........................................................ B05D 3/02
[52] U.S. Cl. .................................... 427/385.5; 427/388.2; 427/388.5; 525/418; 525/443; 525/519
[58] Field of Search .................... 427/385.5, 388.2, 427/388.5; 525/418, 443, 519

[56] References Cited

U.S. PATENT DOCUMENTS

| | | | |
|---|---|---|---|
| 4,419,495 | 12/1983 | Davis | 525/109 |
| 4,892,906 | 1/1990 | Pham et al. | 524/730 |
| 5,166,289 | 11/1992 | Yezrielev et al. | 525/443 |
| 5,210,155 | 5/1993 | Yezrielev et al. | 525/442 |
| 5,239,018 | 8/1993 | Yezrielev et al. | 525/418 |

*Primary Examiner*—Michael Lusignan
*Attorney, Agent, or Firm*—R. D. Jordan

[57] ABSTRACT

The invention relates to the use of polybasic acids as gloss reduction agents in the preparation of paint or coating compositions based on hydroxy or phenolic functional resins and also containing an amino crosslinking agent and a pigment. Cured coatings exhibiting good flexibility, hardness and solvent resistance, as well as reduced or controllable gloss are obtained.

36 Claims, No Drawings

GLOSS REDUCTION AGENT FOR SOLVENT BASED PIGMENTED COATING FORMULATIONS

BACKGROUND OF THE INVENTION

1. Field of the Invention

The present invention relates to solvent-based pigmented coating compositions containing gloss reducing agents and a process for preparing such compositions.

2. Description of Related Art

Thermosettable coating formulations, particularly polyester or diester-based coating compositions, are often the materials of choice for application to various substrates, particularly metal substrates, as a paint or a protective coating. Such coatings can be formulated to provide a good balance of properties such as hardness, flexibility, solvent resistance, corrosion resistance, weatherability and gloss. The enhancement of these properties depends on many factors including type, molecular weight, monomer composition, and glass transition temperature (Tg) of the resin; type and amount of the crosslinker; curing conditions; curing catalysts; pigments; fillers and additives. Variations of these parameters can be used to create a wide range of differences in film properties to fit requirements for a number of diverse applications. However, it is not always possible to optimize all of the desirable properties simultaneously.

One of the properties in need of control in such compositions is the degree of finish gloss of the cured coating. Regulation of gloss is important in the development of solvent-based pigmented coatings. Depending on the ultimate application, cured coatings may desirably have a high gloss (>70), intermediate gloss (50–60), semi-gloss (20–40) or low gloss (<15), measured as % gloss at 60° in accordance with ASTM D-523.

One known method for controlling gloss in high gloss, pigmented coating compositions is to include a quantity of so called "flatting agents" into the coating formulation. These agents are finely divided particulate materials of irregular shape which tend to dull the surface appearance of the cured coating by dispersing incident light rays, and include materials such as silica, barytes, diatomaceous earth and heavy metal soaps.

Some of the disadvantages of using these materials to control gloss is that they must be added to the coating formulation as very fine dispersions in suitable organic solvents, which can contribute to a higher-than-desirable content of volatile solvents in the coating formulation. They can also affect the degree of crosslinking which can be achieved when the applied coating is cured, particularly in coating formulations containing relatively high pigment loadings.

Gloss regulation also appears to be more difficult for higher pigment loadings.

Gloss reduction in powdered, epoxy-based coatings has also been achieved by including into the formulation a minor amount of a copolymer of ethylene and acrylic acid, as disclosed in U.S. Pat. No. 4,419,495.

There exists, however, a continuing need to develop gloss control agents which are effectively used in solvent-based, pigmented, resin-based coating formulations and which minimally affect the physical and chemical properties of the cured coating, especially for coatings formulations with high pigment to binder ratios.

SUMMARY OF THE INVENTION

The present invention is directed toward curable compositions containing a mixture of a hydroxy or phenolic functional resin having a number average molecular weight in the range of from about 400 to about 10,000, an amino crosslinking agent, a pigment material and, as a gloss reduction agent, a polybasic organic or inorganic acid or salt thereof, said agent present in said composition in an amount sufficient to reduce the gloss of the cured composition. Preferred gloss reduction agents are polycarboxylic acids having the formula D—(COOH)$_q$ where D is an organic radical of molecular weight of from 28 to about 2000 and q ranges from 2 to 4, and their partial salts.

The invention also provides for a process for reducing the gloss of such pigmented hydroxy or phenolic functional resin compositions comprising forming a mixture of the resin, the pigment, an amount of said gloss reduction agent sufficient to reduce the gloss of the cured composition, and an effective amount of an amino crosslinking agent and optional crosslinking catalyst, and heating the resulting composition to crosslink the composition.

The compositions of the present invention are particularly adapted to be formulated with organic solvents to provide liquid paint and coating formulations which, when applied to a substrate and cured, form durable thermoset protective coatings having excellent flexibility, hardness and weatherability, even where relatively high pigment loadings are present in the composition, and gloss which can be controlled as a function of the identity of and amount of gloss control agent incorporated into the composition.

DETAILED DESCRIPTION OF THE INVENTION

Polybasic acids suitable for use as gloss reduction agents in accordance with this invention include both organic and inorganic acids as well as their salts. Inorganic polybasic acids include phosphoric acid, phosphorous acid, pyrophosphoric acid and polyphosphoric acid. Organic acids include di-sulfonic acids such as benzene disulfonic acid, toluene disulfonic acid, nonylbenzene disulfonic acid, dinonylnapthtalene disulfonic acid, dodecylbenzene disulfonic acid, and $C_1$ to $C_{16}$ mono esters of phosphoric acid. Mixtures of such acids may also be used.

Some of the above recited acids are known catalysts used in the esterification reaction to prepare polyester resins or to catalyze the crosslinking reaction of the amino crosslinking agent which is added to the composition. For example, acids such as phosphoric and dinonylnaphthalene disulfonic acid are disclosed in EPA 0419088 to be useful for catalyzing esterification reactions and/or amino crosslinking reactions. Since the optimum quantity of acid required to achieve the desired gloss reduction may differ from the optimum quantity desired to achieve proper crosslinking, it is preferred to employ polycarboxylic acids or their salts as the gloss reduction agent because the latter do not themselves catalyze amino crosslinking reactions, and gloss may therefore be controlled independent of crosslinking activity.

Suitable polycarboxylic acids include di, tri and tetracarboxylic acids having the formula D—(COOH)$_q$ where D is an organic radical of molecular weight of 28 to about 2000 and q is an integer ranging from 2 to 4. Suitable acids include adipic acid, succinic acid, glutaric acid, fumaric acid, maleic acid, cyclohexane dicarboxylic acid, azeleic acid, sebasic acid, dimer acid, citraconic acid, chloromaleic acid, mesaconic acid, aconitic acid, itaconic acid, as well as their anhydrides, and mixtures thereof.

Another suitable category of polycarboxylic acids are low molecular weight polyester polycarboxylic acids where D in the above formula is the diester residium of the reaction product of a polyol having from 2 to about 10 carbon atoms and 2 to 4 hydroxy groups and an excess of one or a mixture of polycarboxylic acids having from 2 to about 10 carbon atoms. These polyester polycarboxylic acids may be prepared by the esterification reaction between a polyol such as ethylene glycol, propylene glycol, neopentyl glycol, pentaerythritol, glycerol and the like and an excess of one or a mixture of aliphatic or aromatic polycarboxylic acids inclusive of those listed above. Preferred polyester-polycarboxylic acids have a number average molecular weight of from about 260 to 2000.

The polybasic acids described above may be employed in the acid form or may be partially or totally neutralized to the salt form. The salts may include alkali or alkaline earth salts, e.g. sodium, potassium, calcium, barium and the like, or preferably the more volatile amine salts such as ammonium, lower alkylamino, pyridine, pyrolidine, oxazolidine and like salts. The salts appear to be somewhat less effective as gloss-reduction agents, but this effect can be beneficial in terms of further controlling target gloss values in the cured polyester surface as hereinafter discussed.

The polybasic acids described above should be selected such that they are at least partially, preferably completely, soluble at the levels used in the liquid, crosslinkable coating composition.

Polymers which may be employed as the resinous component of the composition of this invention include hydroxy or phenol functional resins which are crosslinkable using the amino crosslinking agents described herein. These resin systems include hydroxy-functional acrylic copolymer resins prepared by copolymerizing at least one hydroxy-substituted alkyl (meth) acrylate and at least one non-hydroxy substituted alkyl (meth) acrylate; alkyd resins such as those prepared by reacting a di- or polyhydric alcohol and a di- or polybasic acid or acid derivative and an oil, fat or acid derivative thereof; hydroxy-terminated polyesters or diesters; phenol-terminated polyesters or diesters and polycarbonate analogs to the above-described polyesters and diester resins and like resin systems such as disclosed in U.S. Pat. Nos. 5,210,155, 5,239,018 and 5,166,289.

Preferred resins used as resinous component in the compositions of this invention are hydroxy-terminated polyesters or diesters prepared by forming the ester condensation product of one or a mixture of dicarboxylic acids or ester forming derivatives thereof and a molar excess of one or more polyols. The more preferred resins comprise polyester or diester diols which may be end-capped with a carboxylic acid substituted phenol, and polyester or diester diacids which may be end capped with a dihydric phenol. Preferred polyester resins generally exhibit a number average molecular weight within the range of from about 400 to about 10,000, more preferably from about 1500 to about 7500.

Polyester diols may be formed by the condensation reaction of a di or polyol with a di or polyacid. The polyol generally contains 2 to about 10 carbon atoms, more preferably about 2 to 8 carbon atoms, in addition to having 2 to about 6, preferably 2 to about 4, hydroxyl groups. Some preferred examples of the polyols include one or more of the following: neopentyl glycol; ethylene glycol; propylene glycol; butanediol; hexamethylenediol; 1,2-cyclohexanedimethanol; 1,3-cyclohexanedimethanol; 1,4-cyclohexanedimethanol; trimethylol propane; pentaerythritol; neopentyl glycol hydroxypivalate; diethylene glycol; triethylene glycol; tetraethylene glycol; dipropylene glycol; polypropylene glycol; hexylene glycol; 2-methyl 2-ethyl 1,3-propanediol; 2-ethyl 1,3-hexanediol; 1,5-pentanediol; thiodiglycol; 1,3-propanediol; 1,3-butanediol; 2,3-butanediol; 1,4-butanediol; 2,2,4-trimethyl 1,3-pentanediol; 1,2-cyclohexanediol; 1,3-cyclohexanediol; 1,4-cyclohexanediol; glycerol; trimethylolpropane; trimethylolethane; 1,2,4-butanetriol; 1,2,6-hexanetriol; dipentaerythritol; tripentaerythritol; mannitol; sorbitol; methylglycoside; 2-butyl 2-ethylpropanediol- 1,3; and mixtures thereof.

The polyacids contain about 2 to 34 carbon atoms in aliphatic or aromatic moieties, and at least 2, preferably no more than 4, carboxyl groups which may, alternatively, be present in the form of anhydride groups. The polyacids are preferably one or more of the following: phthalic anhydride, terephthalic acid, isophthalic acid, adipic acid, succinic acid, glutaric acid, fumaric acid, maleic acid, cyclohexane dicarboxylic acid, including 1,2; 1,3 and 1,4 isomers, trimellitic anhydride, azeleic acid, sebasic acid, dimer acid, pyromellitic dianhydride, substituted maleic and fumaric acids such as citraconic, chloromaleic, mesaconic, and substituted succinic acids such as aconitic and itaconic. Mixtures of polyols or polyacids or both can be employed.

Termination of the polyester molecules by hydroxy-containing monomers is provided by using a molar excess of the diol in the polyester-forming reaction.

Polyesters exhibiting good flexibility properties when cured are preferably prepared using aliphatic reactants on the polyol side and aliphatic or mixed aliphatic/aromatic reactants on the acid side. Examples of such polyesters are the hydroxy terminated condensation products of adipic acid, neopentyl glycol and phthalic, isophtahlic, terephthalic acids and/or phthalic anhydride.

Another specific class of polyester resins which may be used in preparing the coating formulations of this invention are phenol terminated diesters as disclosed in U.S. Pat. No. 5,210,155, the disclosure of which is incorporated herein by reference. These materials are characterized by the structure 1:

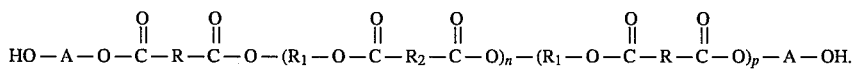

wherein R is an aliphatic divalent hydrocarbon radical containing 2 to 40 carbon atoms or a mixture of such radicals, provided however that R contains at least about 8 carbon atoms when n is o and p is o, $R_1$ is an aliphatic or cycloaliphatic hydrocarbon radical containing 2 to 40 carbon atoms or a mixture of such radicals, $R_2$ is an aliphatic, aromatic or a mixture of aliphatic and aromatic hydrocarbon radicals having from 2 to 40 carbon atoms, A is divalent aromatic radical selected from the group consisting of phenylene, naphthylene or bis phenylene in which two phenylene groups are connected to each other directly or through divalent atoms or radicals, p is 0 or 1, n is 0 or an integer ranging from 1 to about 40, provided however, that p is 0 when n is 0 and p is 1 when n is an integer.

These diesters may be generally categorized as the esterification product of a backbone material containing terminal carboxyl groups and a dihydric phenol such that each terminal group present on the backbone material reacts with a single hydroxy group present on the dihydric phenol resulting in an oligomer or polymer containing a free aromatic hydroxy group at terminal ends of the polymer chain. The backbone material may be composed of: (a) an aliphatic dicarboxylic acid or mixtures of such acids, having from about 8 to about 40 carbon atoms in which case n and p of formula 1 would each be o; and (b) a carboxy-terminated polyester or polyester/alkyd reaction product of one or more aliphatic dicarboxylic acids having from 2 to 40 carbon atoms, or mixtures of such acids with one or more aromatic dicarboxylic acids having from 8 to 40 carbon atoms, in which case in formula 1, n would be an integer ranging from 1 to about 40 and p would be 1.

Diesters of type (a) described above are characterized by the following general formula 2:

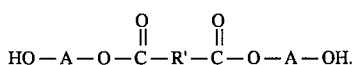
2 wherein R' is an aliphatic radical containing from about 8 to about 40 carbon atoms and A is as defined above.

Diesters of the type (b) described above are characterized by the following general formula 3:

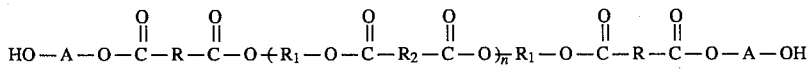
3 wherein R is an aliphatic or cycloaliphatic radical containing from 2 to about 40 carbon atoms, n is an integer ranging from 1 to about 40, and $R_1$, $R_2$ and A are as defined above.

The dihydric phenols which may be connected by an ester linkage to the terminal carboxyl groups present in the backbone material are aromatic compounds having two hydroxy substituent groups attached directly to an aromatic ring and may be represented by the structure:

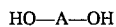

wherein A is a divalent radical selected from the group consisting of phenylene, naphthylene or bis phenylene radicals having the structure:

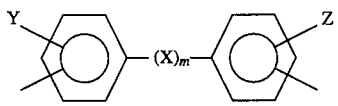

wherein m is 0 or 1, X is selected from the group consisting of a $C_1$ to $C_{12}$ hydrocarbon divalent radical, cycloaliphatic divalent radical having 5–12 carbon atoms, S, O, and $R_4$—C—$R_4$ wherein $R_4$ may be the same or different and is selected from the group consisting of hydrogen, $C_1$ to $C_6$ alkyl, cycloalkyl, phenyl and $CF_3$, and Y and Z are independently selected from the group consisting of hydrogen, halogen, $C_1$ to $C_4$ alkyl and $C_1$ to $C_4$ alkoxy.

Examples of preferred dihydric phenols include hydroquinone, resorcinol, phenolphthalein, 1,4-dihydroxynaphthalene, 1,5-dihydroxynaphthalene, and 2,6-dihydroxynaphthalene. Examples of preferred diphenols include 2,2-bis(4-hydroxyphenyl) propane [bisphenol A], 1,1-bis(4-hydroxyphenyl) ethane, bis (4-hydroxyphenyl) methane, 1,2-bis (4-hydroxyphenyl) ethane, bis (4hydroxyphenyl) sulfide, 2,2-bis (4-hydroxyphenyl) hexafluoropropane and 1,1-bis (4-hydroxyphenyl) cyclohexane.

Another category of polyester resin which may be utilized in the present invention are materials analogous to those described in formulas 1, 2 and 3 above except that the terminal groups present on the polyester backbone which are esterified with an aromatic phenol are hydroxy rather than carboxyl groups. These ester-phenol capped polyesters are prepared by esterification of the terminal backbone hydroxy moieties with a hydroxy substituted aromatic acid such as hydroxy benzoic acid.

These materials may be generally categorized by the analogous formulas 4 and 5 as follows:

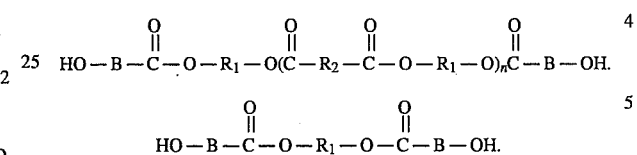

wherein n, $R_1$ and $R_2$ are as defined above and wherein B is phenylene or naphthylene or substituted aromatic moieties. Formula 5 is formula 4 where n is o.

These materials and their method of preparation are more particularly described in U.S. Pat. No. 5,239,018, the disclosure of which is incorporated herein by reference.

As pointed out in the aforementioned U.S. patents, the esterification reactions are normally carried out at temperatures between about 140° and 260° C. and for a period of time ranging from about 3 to about 15 hours with or without the use of an esterification catalyst such as phosphorous acid or toluene sulfonic acid present at a level of about 0.01 up to about 2.0 wt. %. The reaction is optionally carried out in the presence of a solvent. When present, the solvent is preferably an aromatic hydrocarbon. The esterification may be carried out using a single or two stage process.

The preferred polyester resins generally have a glass transition temperature (Tg) of less than about 55° C. and are either liquid materials or are solids readily soluble in coating solvents such as aromatic hydrocarbon solvents, oxygenated solvents or a mixture of an aromatic hydrocarbon with an oxygenated solvent.

Amino-crosslinking agents which are useful in preparing thermoset coating formulation are those materials which will classically react with a hydroxy functional resin.

Suitable materials include, alkylated (butylated or methylated) urea-formaldehyde resins, alkylated melamineformaldehyde resins, (hexamethoxymethylmelamine or mixtures of various hydroxymethyl-melamine-methyl ethers such as the pentamethyoxymethylmelamine and the tetramethoxymethyl melamines), and high-amino/polymeric melamines. The hydroxymethylmelamine and hydroxymethyl ureas may also be etherified with alcohols other than methyl or butyl such as ethyl, propyl, isobutyl and isopropyl. Other suitable aminocrosslinking resins are described in the aforementioned U.S. Patents.

The amount of crosslinking agent on a weight basis incorporated into the final coating composition may generally range from about 2 up to about 30% by weight, based on the combined weight of all components (pigments, etc.) present in the coating composition. The most preferred level of addition is from about 3 to about 25% by weight. This translates into a content of crosslinking agent of from greater than about 5 up to about 45% by weight, based on the weight of the binder alone. For the purposes of this disclosure, the term "binder" refers to the combined weight of the resin and crosslinking agent. The preferred level of crosslinking agent ranges from greater than 5 up to about 30% by weight, based on the weight of binder.

Expressed another way, the content of crosslinking agent should be such that the ratio of the active crosslinking groups, i.e., methylol (alkoxymethyl) groups, of the amino crosslinking agent to the hydroxy or phenol groups on the polymer backbone is desirably from about 1.0:1.0 to 15.0:1.0, preferably from about 1.5:1.0 to 5.0:1.0. The lower the molecular weight of the polyester polymer, the larger the number of terminal hydroxy groups present and the larger the quantity of crosslinking agent required to properly cure the resin. Conversely, the higher the molecular weight of the polyester polymer, the fewer the number of terminal hydroxy groups and the lesser the quantity of crosslinking agent required to properly cure the resin.

Acid catalysts may be used to cure systems containing amino crosslinking agents and a variety of suitable acid catalysts are known to one skilled in the art for this purpose. These include, for example, p-toluene sulfonic acid, methane sulfonic acid, nonylbenzene sulfonic acid, dinonylnapthalene disulfonic acid, dodecylbenzene sulfonic acid, phosphoric acid, phenyl acid phosphate, butyl phosphate, butyl maleate, and the like or a compatible mixture of them. These acid catalysis may be used in their neat, unblocked form or combined with suitable blocking agents such as amines. Typical examples of unblocked catalysts are the King Industries, Inc. products with the tradename NACURE®.

The amount of catalyst employed typically varies inversely with the severity of the baking schedule. In particular, smaller concentrations of catalyst are usually required for higher baking temperatures or longer baking times. Typical catalyst concentrations for moderate baking conditions (15 to 30 minutes at 150° C.) would be about 0.1 to 0.7 wt. % catalyst solids per polymer plus crosslinking agent solids. Higher concentrations of catalyst up to about 2 wt. % may be employed for cures at lower temperature or shorter times; cures at higher temperatures or longer times may not require an acid catalyst.

The same or different solvent(s) which are optionally used during the synthesis of the polyester to dissolve reactants may also be added during the formulation of the coating composition to adjust viscosity so as to provide a formulation with a viscosity usually between about 10 centipoise to 10 poise. One or more solvents can be used. In many cases, a single solvent is used to solubilize the system. However, in other cases it is often desirable to use mixtures of solvents in order to effect the best solubilization, and in particular a combination of aromatic solvents with oxygenated solvents is preferred. Suitable aromatic solvents include toluene, xylene, ethylbenzene, tetralin, naphthalene, and solvents which are narrow cut aromatic solvents comprising $C_8$ to $C_{13}$ aromatics such as those marketed by Exxon Chemical Company under the name Aromatic 100™, Aromatic 150™, and Aromatic 200™. The oxygenated solvents should not be extremely polar such as to become incompatible with the aromatic solvents. Suitable oxygenated solvents include propylene glycol monomethyl ether acetate, propylene glycol propyl ether acetate, ethyl ethoxypropionate, dipropylene glycol monomethyl ether acetate, propylene glycol monomethyl ether, and like materials. The list should not be considered as limiting, but rather as examples of solvents which are useful in the present invention. The type and concentration of solvents are generally selected to obtain formulation viscosities and evaporation rates suitable for the application and baking of the coatings. Typical solvent concentrations in the formulations range from 0 to about 75% by weight with a preferred range between about 5 and 50% by weight and a most preferred range between about 10 and 40% by weight. For the preparation of high solids coatings, the amount of solvent used in the coating formulation is preferably less than 40% of the weight of the formulation.

Pigments are a further component in the curable compositions of this invention. They are generally included at a weight ratio in the range of from about 0.5 to about 5.0 to one pigment-to-binder ratio, the term binder referring to the total weight of polyester resin plus amino crosslinking agent.

The compositions can be preferably formulated with high loadings of pigment, generally at a weight ratio within the range of from about 1.5 to 1 up to about 5.0 to 1 pigment to binder ratio, without destroying the good initial gloss properties found in formulations containing lower pigment loadings. Suitable pigments which may be included in the compositions of this invention are those opacifying pigments normally used in paint and coating formulations and include titanium dioxide, zirconium oxide, zircon, zinc oxide, iron oxides, antimony oxide, carbon black, as well as chrome yellows, greens, oranges, mixed metal oxides, ceramic pigments and the like. Preferred pigments include rutile $TiO_2$ and particularly weather resistant coated types of $TiO_2$. The pigments may also be blended with a suitable extender material which does not contribute significantly to hiding power. Suitable extenders include silica, barytes, calcium sulfate, magnesium silicate (talc), aluminum oxide, aluminum hydroxide, aluminum silicate, calcium silicate, calcium carbonate (mica), potassium aluminum silicate and other clays or clay-like materials.

The more preferred pigment/extender to binder weight loading ratios lie within the range of from about 1.5 to about 5.0, more preferably from about 1.75 to about 4.75, and most preferably from about 2 to about 4 5 parts by weight of pigment, or pigment and extender mixture, per part by weight of binder.

It has been found that the degree of gloss control afforded by the inclusion of the polybasic acids or salts of the present invention into curable polyester formulations is a function of a number of factors.

The first factor is the quantity used. Generally speaking, the gloss control acid or salt may be added to the composition at a level in the range of from about 0.05 to about 5.0% by weight, based on pigment content of the formulation. Increased gloss reduction is achieved at higher levels of addition and less gloss reduction is achieved at lower levels. The preferred level of addition ranges from about 0.05 to about 3.0% by weight, based on the pigment content of the composition.

A second factor affecting the degree of gloss reduction is whether the additive is in the free acid or salt (partial or total salt) form. It has been found that the salts tend to have a lesser effect in gloss reduction than the free acids. Thus, use of the partial or total salt instead of the free acid is another mechanism for controlling or regulating the degree of gloss reduction desired.

A third factor in gloss control is the acid equivalent weight of the gloss control additive where the additive is an organic acid or salt thereof. Acid equivalent weight is defined as the molecular weight of the additive divided by the number of acid groups present in the molecule. Acid equivalent weights can range from about 59 in the case of succinic acid up to about 1000 in the case of higher molecular weight additives such as polyester dicarboxylic acids. In general, it has been found that the higher the acid equivalent weight, the less flatting or gloss reduction effect is achieved. Thus it is preferable to use organic acid gloss control additives having an acid equivalent weight of less than about 200 in formulations where maximum gloss reduction is needed, e.g. formulations containing pigment at a pigment to binder ratio of about 2.5 or less, and to use additives having an acid equivalent weight of greater than about 200 in formulations containing high pigment loadings, since formulations with high pigment loadings are normally less glossy when cured.

A fourth factor in gloss control is the sequence of addition of the gloss control additive during the formulation steps. It has been found that enhanced gloss reduction is achieved by adding the gloss control agent prior to the addition of the catalyst used to crosslink the resinous binder.

Where the compound added to the composition to reduce gloss (flatting agent) has no or little catalytic activity as an amino crosslinking catalyst, e.g., where the flatting agent is based on a polycarboxylic acid, then it is preferably used in combination with one or more of the conventional acid or blocked acid crosslinking catalysts of the type described above, particularly where the composition contains pigment-to-binder at a ratio in excess of 1. Where the flatting agent is a polybasic acid or salt which also has catalytic crosslinking activity, e.g., where the flatting agent is an organic disulfonic acid or phosphoric acid, then it may optionally be used in combination with a different crosslinking catalyst which does not possess significant flatting properties, e.g., a monobasic sulfonic acid. The use of a combination of flatting agent and nonflatting crosslinking catalyst allows one to target desired gloss values and desired degree of crosslinking independently, particularly with respect to compositions containing higher loadings of pigment at the 1.5 to 5.0 pigment-to-binder ratio.

Coating formulations of the present invention may be prepared by first forming a mill base. The mill base may be prepared by grinding a mixture of pigment, resin and solvent in a high speed disc disperser such as Byk-Gardner DISPERMAT® Model CV to form a pigment concentrate. The gloss reduction additive or a portion thereof may be added during the formation of the mill base concentrate, although it may be added later, but prior to the addition of the resin crosslinking catalyst. This mill base is then let down (mixed) under mixing conditions with the remaining components of the formulation which include additional resin, solvent, crosslinking agent, the balance of the gloss reduction agent (if any), and the catalyst.

The coating compositions of the invention may be applied to substrates by any suitable conventional technique such as spraying, roller coating, dip coating and the like. The composition may be applied in liquid form, and preferably is dispersed in an organic solvent. Typical solvent concentrations in the formulations generally range from 0 to about 75% by weight, with a preferred range of between about 5 and 50% by weight and a most preferred range of between about 10 and 45% by weight.

Satisfactory baking schedules for formulations of the present invention vary widely including, but not limited to, low temperature bakes of about 30 minutes at temperatures around 100° C. for large equipment applications, and high temperature bakes of about 5 to 10 seconds in 315° C. to 350° C. air temperature for coil coating applications. Generally speaking, sufficient baking in coil coating applications is achieved when the actual temperature of the underlying metal reaches at least 180° C., and more preferably at least 200° C. In general, the substrate and coating should be baked at a sufficiently high temperature for a sufficiently long time so that essentially all solvents are evaporated from the film and chemical reactions between the polymer and the crosslinking agent proceed to the desired degree of completion. The desired degree of completion also varies widely and depends on the particular combination of cured film properties required for a given application.

Required baking schedules also depend on the type and concentration of catalysts added to the formulations and on the thickness of the applied coating film. In general, thinner films and coatings with higher concentrations of catalyst cure more easily, i.e., at shorter baking times and/or lower temperatures.

The crosslink density and degree of crosslinking can be monitored by evaluating the impermeability of the cured coating to organic solvent. A suitable test for evaluating this property is MEK rub test as described in paragraph 5.2 of ASTM D3732. This test measures the number of double rubs of a swab soaked with methyl ethyl ketone (MEK) required to completely remove the cured coating from a substrate. Generally speaking, the coatings of this invention are crosslinked sufficiently such that MEK rub values of greater than about 5, more preferably of at least 15 and most preferably more than 50 or 100 are achieved.

The compositions of this invention may also be blended with other crosslinkable polymer materials to improve the physical and chemical properties of the latter. Examples of suitable blend polymers include acrylic and methacrylic polymers and copolymers, epoxy resins, alkyd resins, epoxy/phenolic resins, epoxy/acrylic resins, aromatic and aliphatic urethane polymers, chlorinated rubber, cellulose esters and other polyester resins. Respective blend ratios of 1:20 to 20:1 may be used.

Many compositions described in this invention, especially those containing esterphenol-capped polyesters with P/B ratios greater than about 1.5, are useful as coatings for building products and other items which require exterior durability. They can be applied by coil coating and spray coating methods. Also, various conventional Coatings additives, including but not limited to flow modifiers, rheology modifiers, pigment dispersants, anti-settling aids, UV screeners and UV stabilizers, may be optionally added to the compositions of the this invention to improve their physical and chemical properties.

The following examples illustrate but are not intended to limit the scope of this invention.

The following examples 1 and 2 show the preparation of esterphenol-capped polyesters.

Example 1

Into a 5-liter, four-necked flask equipped with a mechanical stirrer, heating mantle, nitrogen sparger, 10 inch column, on top of which is a Dean Stark trap and chilled water condenser, and thermometer fitted with a temperature controller, are charged 211 g. of phthalic anhydride (PA), 788 g. of isophthalic acid (IPA), 1042 g. of neopentyl glycol (NPG), and 150 g. Aromatic™ 100 solvent (a narrow-cut solvent of $C_9$–$C_{12}$ aromatics marketed by Exxon Chemical Company). The contents are heated to melting, stirred, and heating is continued to about 170° C. where the solvent/water azeotrope starts to distill out. Water removal is used to maintain the reaction. Heating is continued and the temperature allowed to rise as the water is removed to a final temperature of 220° C. The total overhead collected, which is principally a mixture of neopentyl glycol and water is 243 g. The reaction mixture is cooled and charged with 486 g. of adipic acid (AA) and 138 g. of p-hydroxybenzoic acid (PHBA). The contents of the reactor are stirred and heating is continued until the temperature reaches about 140° C. The overhead collected in the first phase of the reaction is then added dropwise in order to strip the water present in the overhead away from the NPG. Heating is continued and the temperature slowly rises to 250° C. as the water formed due to the reaction distills. The reaction is stopped after the theoretical amount of water is removed which takes about 19 hours. The reaction product is cooled and the acid number is determined (7.0 mgs. KOH/g). The product is then diluted by adding 633 g. of ethyl 3-ethoxy propionate (EEP) and 510 g. of Aromatic™ 100 solvent. The non volatile material (NVM) measured is 64.8 (1 hour at 110° C). The reduced viscosity of a 10% (w/v) solution of the resin (100% basis) in a 50/50 mixture of glacial acetic acid and methyl amyl ketone (MAK) is 0.175 and the number average molecular weight is about 4660 (calc.). This polyester can be abbreviated as follows:

NPG/AA/PA/IPA/PHBA: 20/6.65/2.85/9.5/2.0

EXAMPLE 2

Into a 5-liter, four-necked flask equipped with a mechanical stirrer, heating mantle, nitrogen sparger, 1-inch column, on top of which is a Dean-Stark trap and chilled water condenser, and thermometer fitted with a temperature controller, were charged 1042 g of NPG, 473.1 g of terephthalic acid (TPA), 473.1 g of isophthalic acid (IPA) and 138 g of PHBA and 200 g of Aromatic™ 150 solvent. The contents were heated to melting and stirred to 190° C. when the solvent/water azeotrope started to distill out. Heating continued with removal of water until a temperature 230° C. was reached. Contents were kept at this temperature until they became clear and then for 2 hours more. The reaction mixture was then cooled to about 120° C. and 554.8 g of adipic acid was charged into the reactor. The contents were then stirred and heating resumed to 140° C. The overhead collected in the first phase of the reaction was then added dropwise to strip the water present in the overhead away from dissolved NPG. Heating continued, and the temperature slowly rose to 250° C. as water formed due to the reaction distilled out. The reaction was stopped after the theoretical amount of water was collected and an acid number of 9 mg KOH/g resin was reached. The process took about 15 hours. The product was then cooled to 140° C. and diluted with 425 g of Aromatic™200 and 625 g of EXXATE™ 700 (mixture of hexylacetates). The measured NVM was 67.64%. The reduced viscosity was 0.229. This polyester can be abbreviated as follows:

NPG/AA/TPA/IPA/PHBA=20/7.6/5.7/5.7/2.0

The following example describes the preparation of a polyesterdicarboxylic acid flatting agent.

EXAMPLE 3

Into a 2 liter, four-necked flask equipped as in Example 2 were charged 340 g NPG, 241.8 g AA, 477 g of PA and 200 g of xylene. The contents were purged with nitrogen gas and heated to 150° C. when water distillation began. Heating continued to 190° C. until water formation stopped (about 3 hours). The contents were then cooled to 70° C. and diluted with 300 g of 1-butanol. The product is a polyesterdicarboxylic acid with a NVM= 67.1%, acid number 174 g KOH/g solids and an acid equivalent weight of 322.

Pigmented paints were generally prepared by grinding titanium dioxide into the resin formulations using a high speed disk disperser such as the Byk-Gardner DISPERMAT™ Model CV. First a mill base containing $TiO_2$, polyester resin and solvent was ground; then this mill base was letdown with the remaining ingredients in the formulation. Specific weights for two paints and given in the following examples:

EXAMPLE 4–5

Mill Base:
  200.6 g esterphenol-capped resin of Example 1;
  650.0 g $TiO_2$ (DuPont TI-PURE™ R-960);
  149.4 g Aromatic™ 200/Butyl CELLOSOLVE™ mixture at 3/1 weight ratio.
Masterbatch Formulation:
  300.0 g Mill base (above);
  20.1 g esterphenol-capped resin of Example 1;
  13.3 g hexamethoxymethyl melamine (CYMEL™ 303);
  0.56 g Dow-Corning 57 silicone flow additive diluted to 25% in butanol;
  42.7 g Aromatic™ 200
  14.2 g Butyl CELLOSOLVE™
Paint Formulations:

Example 4

A 50 g portion of the above masterbatch was catalyzed with 0.16 g of King Industries' NACURE™ 3525 (dinonyl-napthalene disulfonic acid neutralized with an organic amine). In this example, NACURE™ 3525 is both a flatting agent and a crosslinking catalyst.

Example 5

Another 50 g portion of the above masterbatch was catalyzed with 0.32 g of King Industries' NACURE™ 4167 (dialkyl ester of phosphoric acid neutralized with an organic amine), which is a monobasic acid.

Cured films were prepared from the compositions of Examples 4 and 5 as follows:

Thin films of formulations described in Examples 4 and 5 were applied to steel test panels via drawdowns. The basic procedures are outlined in ASTM Test Procedure D823-87, Method E. Test panels are either untreated Type D or Type S cold rolled steel panels obtained from the Q-Panel Company or polished, BONDERITE® 1000 (iron-phosphate treatment) panels obtained from the Parker-Amchem Company. Panel sizes are either 4"×8", 3"×6", 6"×12" or 3"×5".

Wire-wound drawdown rods and in some cases a Precision Laboratory Drawdown Machine (both from the Paul N. Gardner Company) are used to apply films via handpulled drawdowns (Method E). Target dry film thicknesses are 1 mil.

After wet films are applied as described above, panels are allowed to flash-off solvents for about 10 minutes at room temperature. The films are then cured by baking them in a Blue M Electric Class A oven. All panels lay in a horizontal position during flash-off and baking.

Hardness, flexibility, gloss and solvent resistance of the coated panels were evaluated. Flexibility was determined by the T-Bend test as set forth in ASTM D 4145-83 which measures the flexibility and adhesive strength of the baked coating formulation on the substrate. T-bend rating is the minimum number of thicknesses of metal around which the coated metal is bent until no fracture or adhesion failure of the coating occurs. Generally, the lower the T-bend value, the better the adhesion and flexibility of the coating. Generally speaking, for coil coating applications, T-Bend test results of 5 or less are considered acceptable. Test results of 2 or less are considered good.

Pencil hardness was evaluated in accordance with ASTM D3363; MEK (methyl ethyl ketone) resistance was evaluated by the general solvent rub method described in paragraph 5.2 of ASTM D 3732; and gloss was measured in accordance with ASTM D-523, measured as % gloss at a 60° angle.

Data are summarized in Table I.

As can be seen from Table I, the disulfonic acid (NACURE™ 3525) not only catalyzes cross-linking but also reduces gloss from 93 to 14. This demonstrates that using the catalyst as the gloss reduction additive at high P/B ratios can sometimes reduce gloss below desired levels which are typically around 30 units of 60 degree gloss.

EXAMPLES 6–11

Additional masterbatches and films were prepared from the resin of Example 1 using techniques similar to those described in Examples 4 and 5. For this series of examples, the polyesterdicarboxylic acid of Example 3 was used as a flatting additive in Examples 7, 9 and 11. The polyesterdicarboxylic acid was charged into the masterbatches before adding the catalysts. The data are given in Table I. Additive per pigment is given as % solid per solid. As can be seen from Table I, addition of the polyesterdicarboxylic acid reduces gloss more effectively at P/B=3 than at P/B=2. This makes it a convenient additive to regulate gloss for highly pigmented formulations. It can also be seen that different catalysts generate different glosses in high P/B formulations. For example, a p-TSA catalyzed coating (Example 6) had gloss 32 without any additive while a NACURE™ 4167 catalyzed coating (Example 8) had gloss 79.

EXAMPLES 12–16

This series of examples was made with the resin of Example 2 which generates higher gloss coatings as compared with the resin of Example 1. Preparations of the mill base, masterbatches and films were similar to those described in Examples 4 and 5.
Mill Base:

650.0 g TiO$_2$
192.2 g Resin from Example 2
118.3 g Aromatic™ 200
39.5 g DOWANOL™ DPM solvent Masterbatch formulations for Examples 12–16 are given in Table II. Paints were prepared by addition of catalyst or catalyst + additive to 50 g portions of each masterbatch as follows:

Example 12

0.2 g of NACURE™ 4167 and 0.33 g of the 50% resin solution from Example 3.

Example 13

0.2 g of NACURE™ 4167.

Example 14

0.16 g of BYK™-451 (amine blocked para-toluene sulfonic acid) catalyst and 0.33 g of the 50% resin solution from Example 3.

Example 15

0.16 g of BYK™-451 catalyst.

Example 16

0.16 g of BYK™-451 catalyst and 0.7 g of a solution of adipic acid in methanol (15.6 wt % AA).

Data for the paints are summarized in Table 1. As seen from the Table, when the catalyst is charged before the flatting additive (resin from Example 3), a formulation with high gloss is produced even at high P/B ratios (Example 12). The same formulation with catalyst added after the additive (which is already present in the masterbatch) has reduced gloss (Example 13). Formulations based on the same resin at P/B=2 are practically insensitive to the order of addition of catalyst and flatting additive (Examples 14 and 15). Use of adipic acid (diacid with acid equivalent weight of 73) as a gloss reduction additive, however, provides significant gloss reduction in the same P/B=2 formulation (Example 16). These examples demonstrate that diacid additives with smaller acid equivalent weights can be more effective gloss reduction agents than polyesterdicarboxylic acids with higher acid equivalent weights.

TABLE I

| | | | | | PANELS CURED 3' TO 4' @ 250° C. | | | | | | |
|---|---|---|---|---|---|---|---|---|---|---|---|
| | ADDITIVE | | CATALYST | | | | | | | | |
| Example | Type | % based on Pigment | Type | % based on Binder | P/B | CYMEL 303% | Gloss 60° | T-Bend | Penc Hard | MEK Rub | Comments |
| 4 | NACURE 3525 | 0.167 | — | — | 3 | 20 | 14 | 4 | 2H | 71 | (a) |
| 5 | — | — | NACURE 4167 | 1 | 3 | 20 | 93 | 2 | 5H | 80 | — |
| 6 | — | — | p-TSA | 0.2 | 3 | 20 | 32 | 3 | 5H | 46 | — |
| 7 | Example 3 | 0.333 | p-TSA | 0.2 | 3 | 20 | 18 | 4 | 4H | 56 | (c) |
| 8 | — | — | NACURE 4167 | 0.5 | 3 | 20 | 79 | 2 | 5H | >100 | — |
| 9 | Example 3 | 0.333 | NACURE 4167 | 0.5 | 3 | 20 | 34 | 2 | 4H | 38 | (c) |

TABLE I-continued

| | ADDITIVE | | CATALYST | | PANELS CURED 3' TO 4' @ 250° C. | | | | | | | |
|---|---|---|---|---|---|---|---|---|---|---|---|---|
| Example | Type | % based on Pigment | Type | % based on Binder | P/B | CYMEL 303% | Gloss 60° | T-Bend | Penc Hard | MEK Rub | Comments |
| 10 | — | — | p-TSA | 0.4 | 2 | 20 | 75 | 2 | 5H | >100 | — |
| 11 | Example 3 | 1 | p-TSA | 0.4 | 2 | 20 | 64 | 3 | 5H | >100 | (c) |
| 12 | Example 3 | 0.667 | NACURE 4167 | 0.6 | 3 | 15 | 99 | 3 | 4H | >100 | (b) |
| 13 | Example 3 | 0.667 | NACURE 4167 | 0.6 | 3 | 15 | 75 | 2 | 4H | >100 | (c) |
| 14 | Example 3 | 1 | p-TSA | 0.3 | 2 | 15 | 74 | 2 | 4H | >100 | (b) |
| 15 | Example 3 | 1 | p-TSA | 0.3 | 2 | 15 | 74 | 2 | 4H | >100 | (c) |
| 16 | adipic acid | 0.5 | p-TSA | 0.3 | 2 | 15 | 21 | 2 | >6H | 44 | (c) |

(a) Additives Serves As Catalyst
(b) Catalyst Added Before Additive
(c) Catalyst Added After Additive

TABLE II

MASTERBATCHES FOR EXAMPLES 12–16

| Masterbatch # | 12 | 13 | 14 | 15 | 16 |
|---|---|---|---|---|---|
| Mill Base | 75 | 75 | 66.7 | 66.7 | 66.7 |
| Resin, Example 2 | 6 | 6 | 14.4 | 14.4 | 14.4 |
| CYMEL 303 | 2.44 | 2.44 | 3.25 | 3.25 | 3.25 |
| Dow Corning 57 (25 wt % in BuOH) | 0.13 | 0.13 | 0.17 | 0.17 | 0.17 |
| Resin, Example 3 | — | 1 | — | 1.3 | — |
| Solvent (Aromatic ® 200/DPM @ 3/1) | 16.43 | 15.43 | 15.48 | 14.18 | 15.48 |

What is claimed is:

1. A coating composition comprising a mixture of:
  a) a curable hydroxy-functional resin having a number average molecular weight in the range of from about 400 to about 10,000;
  b) an amino crosslinking agent capable of curing said resin;
  c) a pigment; and
  d) a gloss reduction additive comprising a polycarboxylic acid having the formula D-(COOH)$_q$ wherein D is an organic radical having a molecular weight of from 28 to about 2000 and q is an integer ranging from 2 to ⁻4, and salts thereof;
  said gloss reduction additive present in said composition in an amount sufficient to reduce the gloss of the cured composition.

2. The composition of claim 1 wherein said resin is a hydroxy or phenolic terminated polyester or diester resin.

3. The composition of claim 1 or 2 wherein said polybasic organic acid is a dicarboxylic acid.

4. The composition of claim 3 wherein said polycarboxylic acid is adipic acid.

5. The composition of claim 1 or 2 wherein said polycarboxylic acid is a polyester carboxylic acid having a number average molecular weight of from about 260 to about 2000.

6. The composition of claim 1 or 2 wherein said gloss reduction additive is present in said composition at a level of from about 0.05 to about 5% by weight, based on the weight of pigment present in said composition.

7. The composition of claim 6 wherein said gloss reduction agent is present in said composition at a level of from about 6.05 to about 3.0% by weight.

8. The composition of claim 1 or 2 further containing from about 0.1 to about 2.0% by weight of a crosslinking catalyst for said amino resin, based on the weight of resin and amino crosslinking agent present in said composition.

9. The composition of claim 8 wherein said crosslinking catalyst is a monosulfonic acid or salt thereof.

10. The composition of claim 1 or 2 wherein said pigment is selected from the group consisting of pigment, a mixture of pigments or a mixture of pigment and pigment extender, said pigment being present in said composition at a weight ratio such that the ratio of pigment to binder components (a) and (b) falls within the range of from 0.5 to 1 up to about 5.0 to 1.

11. The composition of claim 10 wherein the ratio of pigment to binder falls in the range of from greater than 2 to 1 up to about 4.5 to 1.

12. The composition of claim 1 or 2 wherein said amino crosslinking agent is present at a level of greater than about 5 up to about 30% by weight, based on the combined weight of components (a) and (b).

13. The composition of claim 2 wherein said resin is a polyester terminated with phenolic groups.

14. The composition of claim 13 wherein said phenol terminated polyester has a structure selected from the group consisting of:

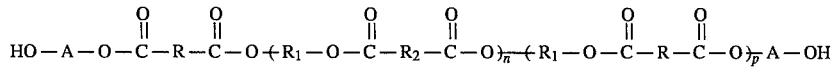

and

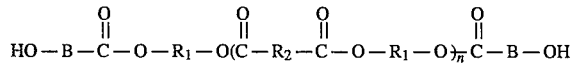

wherein R is an aliphatic divalent hydrocarbon radical containing 2 to 40 carbon atoms or a mixture of such radicals, provided however that R contains at least about 8 carbon atoms when n equals zero and p equals zero, $R_1$ is an aliphatic or cycloaliphatic hydrocarbon radical containing 2 to 40 carbon atoms or a mixture of such radicals, $R_2$ is an aliphatic, aromatic or a mixture of aliphatic and aromatic hydrocarbon radicals having from 2 to 40 carbon atoms, A is divalent aromatic radical selected from the group consisting of phenylene, naphthylene or bis phenylene, p is zero or 1, n is zero or an integer ranging from 1 to about 40, provided however, that p is zero when n is zero and p is 1 when n is an integer, and B is a phenylene radical.

15. The composition of claim 10 wherein said pigment comprises $TiO_2$.

16. The composition of claim 1 or 2 wherein said crosslinking agent is methylolmelamine or an alkoxymethylmelamine.

17. The composition of claim 1 or 2 further containing an organic solvent for said resin present at a level of from about 5 to about 50% by weight of said composition.

18. A method for forming a coating having reduced gloss comprising:
   a) applying the coating composition of claim 17 to a substrate; and
   b) heating said coated substrate to a temperature of at least about 90° C. for a period of time sufficient to drive off volatile materials and to crosslink said coating.

19. A crosslinked coating composition prepared by the method of claim 18.

20. A method for reducing the surface gloss of a coating composition containing a mixture of a crosslinkable resin having a number average molecular weight in the range of from about 400 to about 10,000, an amino crosslinking agent for said resin and a pigment comprising:
   a) forming a mixture comprising said resin, said amino crosslinking agent, said pigment and a gloss reduction additive selected from the group consisting of polybasic organic and inorganic acids and salts thereof;
   b) adding to said mixture from 0 to about 2.0% by weight of crosslinking catalyst to form a second mixture, the amount of said catalyst being based on the weight of said resin and amino crosslinking agent;
   c) applying said second mixture to a substrate to form a coating; and
   d) heating said coating to a temperature sufficient to crosslink said coating, said gloss reduction additive present in said composition in an amount sufficient to reduce the gloss of the cured composition.

21. The method of claim 20 wherein said resin is a hydroxy or phenolic terminated polyester or diester resin.

22. The method of claim 20 or 21 wherein said gloss reduction additive is incorporated in said coating composition at a level of from about 0.05 to about 5.0% by weight, based on the weight of pigment present in said composition.

23. The method of claim 22 wherein said gloss reduction additive is a polybasic inorganic acid or a salt thereof.

24. The method of claim 23 wherein said polybasic inorganic acid is selected from the group consisting of phosphoric, phosphorous, pyrophosphoric and poly phosphoric acids.

25. The method of claim 22 wherein said gloss reduction agent is a polybasic organic acid or a salt thereof.

26. The method of claim 25 wherein said polybasic organic acid is a di-sulfonic acid.

27. The method of claim 26 wherein said di-sulfonic acid is selected from the group consisting of benzene disulfonic, toluene disulfonic, nonylbenzene disulfonic, dinonylnaphthalene disulfonic and docecylbenzene disulfonic acids.

28. The method of claim 25 wherein said polybasic organic acid is a polycarboxylic acid having the formula $D\text{-}(COOH)_q$ wherein D is an organic radical having a molecular weight of from 28 to about 2000 and q is an integer ranging from 2 to 4.

29. The method of claim 28 wherein said polycarboxylic acid is a dicarboxylic acid.

30. The method of claim 29 wherein said polycarboxylic acid is adipic acid.

31. The method of claim 28 wherein said carboxylic acid is a polyester carboxylic acid having a number average molecular weight of from about 260 to about 2000.

32. The method of claim 20 or 21 wherein said pigment is present in said composition at a weight ratio such that the weight ratio of pigment level to the combined resin and amino crosslinking agent binder level is in the range of from about 0.5 to 1 up to about 5.0 to 1.

33. The method of claim 32 wherein said pigment to binder ratio is about 2.5 to 1 or less and said gloss reduction additive has an acid equivalent weight of less than about 200.

34. The method of claim 32 wherein said pigment to binder ratio is greater than about 2.5 to 1 and said gloss reduction additive has an acid equivalent weight of from about 200 to 1000.

35. The method of claim 22 wherein said coating composition contains from about 0.1 to about 2.0% by weight of said crosslinking catalyst for said amino resin.

36. The method of claim 35 wherein said crosslinking catalyst is a monosulfonic acid or salt thereof.

* * * * *